July 12, 1960
R. GRANDGENT ET AL
2,944,763
GUIDANCE SYSTEM
Filed July 13, 1955
2 Sheets-Sheet 1
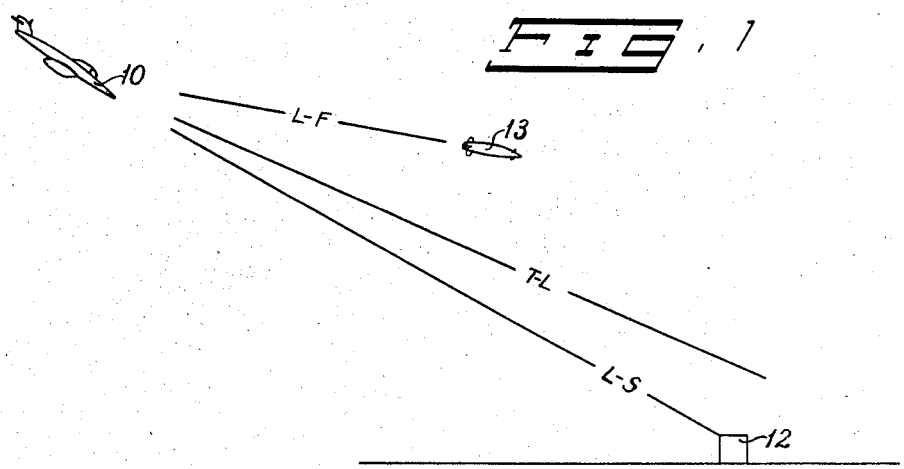
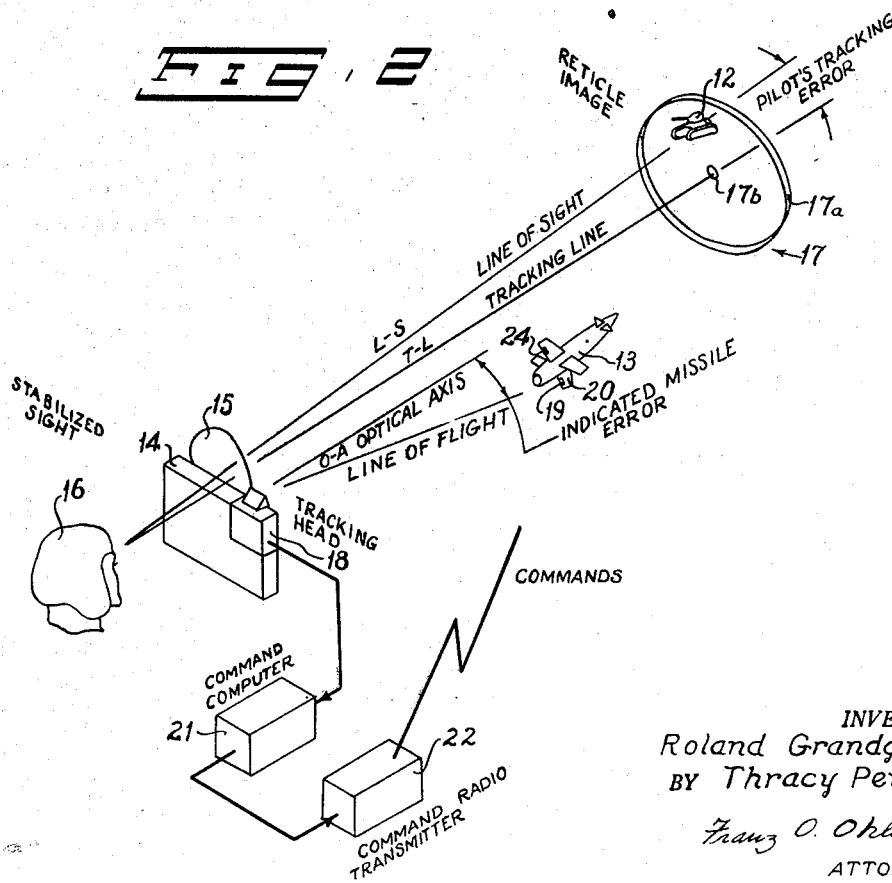
INVENTOR.
Roland Grandgent and
BY Thracy Petrides
Franz O. Ohlson, Jr.
ATTORNEY.

INVENTOR.
Roland Grandgent and
BY Thracy Petrides
Franz O. Ohlson, Jr.
ATTORNEY.

United States Patent Office 2,944,763
Patented July 12, 1960

2,944,763
GUIDANCE SYSTEM

Roland Grandgent, Huntington Station, and Thracy Petrides, New York, N.Y., assignors to Republic Aviation Corporation, Farmingdale, N.Y., a corporation of Delaware Filed July 13, 1955, Ser. No. 521,977

5 Claims. (Cl. 244—14)

(Filed under Rule 47(a) and 35 U.S.C. 116)

This invention relates in general to guidance systems and more particularly to a guidance system for directing or guiding the flight of a missile or rocket.

Among other objects the present invention contemplates a missile guidance system embodying means for establishing a tracking line and for automatically tracking and directing the course of a missile into substantial coincidence with the established tracking line. Further, the missile guidance system contemplated herein is so constructed and arranged that it may be associated with a moving base without affecting its efficient operation.

While the instant missile guidance system may be used with equal facility from a stationary or moving base, it is particularly suited for association with an aircraft to direct the course of a missile launched from the aircraft at a selected target which may be situated either on the ground or in the air. Therefore, the present invention has been illustrated and described herein as used in an aircraft. It is to be understood, however, that the guidance system hereof may be used equally as well from a stationary base such as a rocket or missile launching site or from a moving surface vehicle such as a tank or vessel.

With the above and other objects in view as will become apparent, this invention consists in the construction, combination and arrangement of parts all as hereinafter more fully described, claimed and illustrated in the accompanying drawings wherein:

Fig. 1 is a schematic illustration of an aircraft approaching a ground target and shows the relative positions of the line of flight of the missile, the tracking line, and the pilot's line of sight to the target;

Fig. 2 is a similar view illustrating the instant invention associated with an aircraft and its operation in controlling the flight of a missile.

Figure 3:
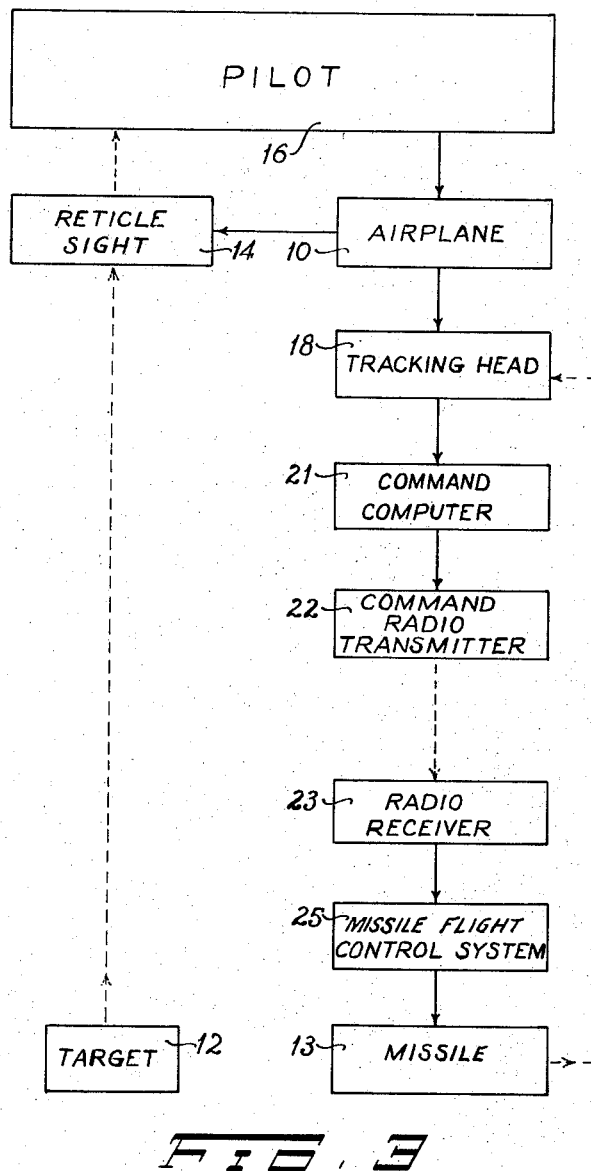
Fig. 3 is a block diagram of the present guidance system.

In many of the missile guidance systems presently in use, the missile is provided with expensive, sensitive equipment for directing its course toward the target. For example, the missile is equipped with an automatic pilot that rides a radio beam transmitted by the airplane and which is directed at the target. Since the missile is expendable in that it is destroyed upon firing or launching, and this destruction occurs whether or not a hit is scored on the target, it is apparent that such systems are not only expensive, but very often wasteful.

Other heretofore known guidance systems require a direct control of the missile during the entire time it is flying toward the target. Systems of this type usually include a control switch or lever, which the pilot operates to control the flight of the missile. In short, by operating this control lever or switch, in much the same manner as the control column of his airplane, the pilot "flies" the missile at the target. This division of the pilot's attention between flying his airplane and the missile, very often results in the missile missing the target. Moreover, during combat conditions pilot survival often depends upon his devoting all of his attention to the flying of his airplane.

In the missile guidance contemplated herein, however, the expensive and intricate apparatus that produces command signals for directing the missile's flight along a selected course is carried entirely by the aircraft, while the expendable missile is provided with only the relatively simple inexpensive equipment for actuating its control surfaces in response to the command signals from the airplane. Further, the instant guidance system is so constructed and arranged that the pilot merely has to fly his airplane toward the target to have the system automatically direct or control the missile's flight toward the target.

Thus, the present invention not only reduces to a minimum the equipment carried by, and expended with, the missile, thereby conserving the expensive and intricate apparatus for subsequent re-use in the same or another airplane, but in addition the pilot can devote a maximum of attention toward flying his airplane. It follows, that the instant missile guidance system is not only more economical and efficient than those theretofore known or used, but also improves the pilot's chances of survival.

In general, the present guidance system comprises sighting means mounted within the airplane and which is aligned with a selected target, through the pilot's maneuvering of the airplane, to establish a tracking line between it and the target. An optical tracking device, adapted to be sensitive to light rays from the visible spectrum as well as infra-red and ultra-violet rays, is positioned within the airplane in such a manner that its optical axis is in close parallel relationship with the tracking line established by the sighting means. Due to this arrangement, the parallax error between the tracking line and the optical axis is reduced to a minimum and, for all practical purposes, they may be considered to be in coincidence.

The missile is so mounted on the airplane that, shortly after its launching therefrom, light rays from the missile are received by the optical tracking device or head which, in response thereto, develops signals indicating the position of the missile with respect to the optical axis and, hence its displacement relative to the tracking line. These position signals are fed to a command computer which converts them into command signals that are transmitted through conventional radio means to the control system of the missile where they are effective to direct the missile's flight so as to bring it into agreement with the optical axis, and hence the tracking line thereby placing the missile on a true course toward the target.

Referring now to the drawings, in particular Fig. 1, 10 designates an airplane in flight toward a target 12. A missile 13, carried by and launched in any conventional manner from the airplane 10, is shown traveling a course or line of flight indicated at L-F. As will be more fully set forth below, a tracking line T-L and a line of sight L-S extend in a forwardly direction from the airplane 10.

The missile guidance system contemplated herein, as shown in Fig. 2, comprises a reticle sight 14 having a transparent reticle image reflector 15. The sight 14 is so mounted in the airplane 10 that the normal or forward range of vision of the pilot 16 is through the reticle image reflector 15. Therefore, when the pilot 16 visually selects a particular target within his forward range of vision, a line of sight L-S is established between his eyes and the target. Thus, as shown in Figs. 1 and 2, the line of sight L-S extends from the pilot 16 through the reflector 15 to the target 12.

The sight 14 is so contructed and arranged that when it is operating a reticle image 17 consisting of a circle 17a having a dot 17b at its center appears on the reflector 15. However, to the pilot 16, the reticle image 17 appears to be projected forwardly to infinity as shown in Fig. 2. Therefore, when the pilot 16 maneuvers the airplane 10 to position the center dot 17b on the target 12, the line of sight L-S and the tracking line T-L come into coincidence.

As the airplane 10 is constantly in motion, it is practically impossible to maintain the dot 17b exactly on the target 12, and the line of sight L-S and the tracking line T-L always in coincidence. The minor variations from such coincidence are known as the pilot's tracking error as shown in Fig. 2. However, once the pilot 16 has brought the dot 17b on the target 12, he merely continues to fly the airplane with a view to maintaining the dot 17b on the target 12 thereby keeping the angle between the line of sight L-S and the tracking line T-L, i.e. the pilot's tracking error at zero or a minimum.

An optical tracking device or head 18 is mounted on the sight 14 with its optical axis O-A in close parallel relationship to the tracking line T-L. Due to this arrangement, the parallax error therebetween is reduced to a minimum and, for all practical purposes, they may be considered to be in coincidence. Additionally, when the pilot 16 centers the dot 17b on the target 12 to thereby establish the tracking line T-L, the optical axis O-A is also aligned with the target 12 so that the course of the missile 13 can be directed along the optical axis O-A to the end that it will strike the target 12.

The missile 13 is provided with any suitable means 19 for emitting light rays. This device 19 is carried on the missile 13, for example on the aft end of one of the stabilizing surfaces 20 thereof. For example, the ray-emitting means 19 may comprise a flare for emitting visible light rays, or an element for emitting infra-red rays. The missile 13 is mounted on the airplane 10 in such a manner that, shortly after its launching therefrom, the light rays from the device 19 are received by the optical tracking device 18 which produces signals indicating the direction and magnitude of displacement of the missile 13 from the optical axis O-A, and hence relative to the tracking line T-L.

To prevent the displacement of the tracking line T-L and optical axis O-A from the target 12 by the rotary movement of the airplane 10 about its yaw and pitch axes, means may be provided to stabilize the tracking line T-L and optical axis O-A in such a manner that they are substantially unaffected by such movement of the airplane 10.

One example of a stabilized sight and tracking device that may be used in the instant guidance system to perform the functions of the sight 14 and the tracking head 18 is fully illustrated and described in the co-pending application of John W. Bogeman, Serial No. 443,069, filed July 13, 1954, and assigned to Republic Aviation Corporation, Farmingdale, New York.

The position signals produced by the tracking head 18 are fed to a command computer 21 which converts them into command signals necessary to direct the course of the missile 13, so as to bring it into agreement with the optical axis O-A. From the computer 21, the command signals are fed to a conventional radio transmitter 22 which transmits them to a conventional radio receiver 23 mounted within the missile 13 and having an antenna 24 carried by one of the stabilizers 20 of the missile 13. The missile 13 is provided with a suitable missile flight control system 25, shown in the block diagram of Fig. 3, that is effective in response to signals received by the radio receiver 23 to actuate the missile's control surfaces. The control system 25 for the missile 13 may be any one of many conventional systems presently available in the art. For example, the missile control system shown in U.S. Patent No. 2,404,942, issued to A. B. Bedford on July 30, 1946, could be utilized to control the missile 13 within the purview of the instant invention. Therefore, in response to the command signals, the missile 13 is directed toward the optical axis O-A. In other words, the angle between the missile's course, or line of flight L-F, and the optical axis O-A, shown in Fig. 2 as the indicated missile error, is constantly reduced to a minimum so as to direct the flight of the missile 13 along the optical axis O-A, and consequently at the target 12.

As the missile 13 approaches the optical axis O-A, the character of the position signals produced by the tracking head 18 change to reflect the change in the direction and magnitude of displacement of the missile 13 relative to the optical axis O-A. When the course or line of flight L-F of the missile 13 comes into agreement with the optical axis O-A, the position signals developed by the tracking head 18 will not indicate any error in the position of the missile 13 relative to the optical axis O-A, and as a result the command signals transmitted to the missile 13 will not actuate its control system in any way to effect a change in the missile's course. However, should the optical axis O-A be moved relative to the line of flight L-F of the missile, as for example, when the pilot 16 maneuvers the airplane 10 to track a moving target 12, or should the line of flight L-F of missile 13 deviate from the optical axis O-A due to some external force such as gravity acting upon the missile 13, the tracking head 18 will immediately produce position signals indicating the error between the line of flight L-F and the optical axis O-A. These position signals will be transmitted to and converted by the command computer 21 into command signals which will be transmitted as hereinbefore set forth to the missile 13 where they will actuate the control system of the missile so as to bring the missile 13 back onto its true course, i.e. with its line of flight in agreement with the optical axis O-A.

Thus, the instant guidance system automatically controls the flight of the missile 13 so as to maintain its course in agreement with the optical axis O-A, and hence in agreement with the tracking line T-L. It is apparent, therefore, that by virtue of the present guidance system, the pilot 16 merely has to fly his airplane 10 so as to maintain the dot or center 17b of the reticle image 17 on the target 12 in order to direct the missile 13 to, and score a hit upon, the target 12.

In Fig. 3, the operation of the instant missile guidance system is shown by way of a block diagram. The pilot 16 views the selected target 12 through the sight 14 thereby, in effect, receiving signals from the target 13 indicating its location. The pilot 16 then maneuvers the airplane 10 to align the reticle 17 of the sight 14 on the target 12 thereby establishing the tracking line T-L to the target 12. This maneuvering of the airplane 10 also moves the tracking head 18 to align its optical axis O-A with the target 12. Thereupon the pilot 16 launches the missile 13. Shortly after this launching of the missile 13, light rays from the device 19 on the missile 13 are received by the tracking head 18 which, in response thereto, produces signals indicating the direction and magnitude of displacement of the missile 13 from the optical axis O-A. These position signals are fed to the command computer 21 which converts them into command signals that are fed to the command radio transmitter 22. From the command radio transmitter 22 the command signals are sent to the radio receiver 23 of the missile 13 the output of which is fed to the missile flight control system 25 to alter the course of the missile 13 to bring it into agreement with the optical axis O-A.

Having thus described the arrangement and operation of the missile guidance system contemplated herein, it will be apparent that it affords an efficient and economical means for directing the course of a missile at a selected target. Moreover, when the present system is used in an aircraft, the pilot merely has to fly his airplane in a normal manner to maintain his sight on the target and the flight of the missile will be controlled automatically by the system so as to always bring the missile on its required course and ultimately into contact with the target.

In short, the pilot in maneuvering the airplane to maintain the dot 17ª of the reticle 17 on the target 12 directly controls the flight of the missile 13 and any and all deviations from its true course are automatically and constantly corrected.

Further, this system is so organized and arranged that the pilot can maintain a close control over the missile until the time it reaches the target, or the pilot may direct or aim the missile at the target and, after assuring himself that it is on a course that will bring it into contact with the target, he may then shut off the system and permit the missile to continue on its flight toward the target without being controlled by the system. Thus, the present guidance system permits the pilot to launch the missile along a true course at the target, and to break away from the line of flight at the target in the event such a maneuver is necessary.

What is claimed is:

1. A guidance system for controlling the flight of a missile launched from a moving base, said system comprising sighting means carried by said base for establishing a tracking line from and substantially in the direction of movement of said base, optical means carried by said base and having an optical axis parallel to said tracking line, said optical means being organized and arranged to track the missile during its flight and to produce signals indicating its position relative to the tracking line and to convert the position signals into command signals, means for transmitting the command signals to the missile, and means carried by the missile and responsive to the command signals to direct the flight of the missile into substantial agreement with the tracking line.

2. A guidance system for controlling the flight of a missile launched from an airplane in flight said system comprising sighting means fixed to the airplane for establishing a tracking line from and in concurrence with the movement of the airplane, optical means carried by the airplane and having an optical axis in relatively close fixed parallel relationship to the tracking line, said optical means being organized and arranged to track the missile and to produce signals indicating the position of the missile relative to the tracking line and to convert the position signals into command signals, transmitting means on the airplane for transmitting said command signals to the missile, receiving means carried by the missile to receive the command signals, and means carried by the missile and connected to said receiving means and responsive to said command signals for directing the line of flight of the missile into substantial agreement with the tracking line aforesaid.

3. A guidance system for controlling the flight of a missile launched from a moving base, said system comprising light ray emitting means carried by the missile, sighting means carried by the base for establishing a tracking line from and coincident with the direction of movement of the base, optical means carried by the base for receiving light rays from said light ray emitting means of the missile and responsive thereto to produce signals indicating the position of the missile relative to the tracking line, means carried by the base to convert the position signals into command signals and for transmitting the command signals to the missile, and means carried by the missile and responsive to the command signals to direct the flight of the missile into agreement with the tracking line.

4. A guidance system for controlling the flight of a missile launched from an aircraft in flight, said system comprising optical sighting means mounted in the aircraft for establishing a tracking line in fixed coincidence with the direction of flight of the aircraft and to a selected target, optical tracking means mounted in the aircraft with its optical axis in close parallel relationship with the tracking line, optical signal emitting means carried by the missile, said optical tracking means being responsive to said optical signals to produce signals indicating the position of the missile relative to the tracking line, means mounted in the aircraft and connected to the tracking means to convert said position signals into command signals required to direct the flight of the missile into substantial coincidence with the tracking line, command signal transmitting means in the aircraft for transmitting the command signals, command signal receiving means in the missile to receive the command signals and means in the missile connected to the command signal receiving means and responsive to the command signals received therefrom to direct the flight of the missile into substantial agreement with the tracking line.

5. A guidance system for controlling the flight of a missile launched from an aircraft in flight, said system comprising fixed optical sighting means mounted in the aircraft for establishing a fixed tracking line substantially coincident with the direction of flight of the aircraft to a selected target, optical tracking means mounted in the aircraft with its optical axis in close proximity to and in parallel relationship with the tracking line, a light source carried by the missile, said optical tracking means being responsive to light received from said light source to produce signals indicating the position of the missile relative to the optical axis, computer means in the aircraft and connected to the optical tracking means and responsive to said position signals to produce command signals required to direct the flight of the missile into substantial agreement with the optical axis of the optical tracking means, means in the aircraft for transmitting the command signals, and means in the missile to receive the command signals and responsive thereto to direct the flight of the missile into substantial agreement with the optical axis.

References Cited in the file of this patent

UNITED STATES PATENTS

| | | |
|---|---|---|
| 1,249,274 | Chandler | Dec. 4, 1917 |
| 2,404,942 | Bedford | July 30, 1946 |
| 2,414,103 | Hunter | Jan. 14, 1947 |
| 2,466,528 | Wyckoff | Apr. 5, 1949 |
| 2,513,367 | Scott | July 4, 1950 |
| 2,745,095 | Stoddard | May 8, 1956 |

FOREIGN PATENTS

| | | |
|---|---|---|
| 990,788 | France | June 13, 1951 |